(12) United States Patent
Argue et al.

(10) Patent No.: US 10,217,098 B2
(45) Date of Patent: Feb. 26, 2019

(54) REPRINTING A PAPER RECEIPT WHERE AN ELECTRONIC RECEIPT WAS ORIGINALLY ISSUED

(71) Applicant: Walmart Apollo, LLC, Bentonville, AR (US)

(72) Inventors: Stuart Argue, Palo Alto, CA (US); Anthony Emile Marcar, San Francisco, CA (US)

(73) Assignee: WALMART APOLLO, LLC, Bentonville, AR (US)

(*) Notice: Subject to any disclaimer, the term of this patent is extended or adjusted under 35 U.S.C. 154(b) by 674 days.

(21) Appl. No.: 13/719,035

(22) Filed: Dec. 18, 2012

(65) Prior Publication Data
US 2014/0172604 A1    Jun. 19, 2014

(51) Int. Cl.
G06Q 20/20    (2012.01)

(52) U.S. Cl.
CPC .................................. *G06Q 20/209* (2013.01)

(58) Field of Classification Search
CPC .............................. G06Q 20/209; G06Q 20/20
USPC ......................................................... 705/1.1
See application file for complete search history.

(56) References Cited

U.S. PATENT DOCUMENTS

| | | | |
|---|---|---|---|
| 5,739,512 A | 4/1998 | Tognazzini | |
| 7,827,077 B2 | 11/2010 | Shiftan | |
| 8,548,859 B2 | 10/2013 | Matkovic | |
| 8,643,875 B2 | 2/2014 | Shapiro | |
| 2003/0055733 A1 | 3/2003 | Lake | |
| 2004/0064373 A1 | 4/2004 | Shannon | |
| 2006/0261149 A1 | 11/2006 | Raghavendra Tulluri | |
| 2007/0045405 A1 | 3/2007 | Rothschild | |
| 2007/0069013 A1* | 3/2007 | Seifert et al. | 235/383 |
| 2009/0204530 A1* | 8/2009 | Hanson | G06Q 20/10 705/35 |
| 2009/0271322 A1 | 10/2009 | Lay | |
| 2010/0039666 A1 | 2/2010 | Tsukada | |
| 2011/0004530 A1* | 1/2011 | Miyagawa | G07G 5/00 705/24 |
| 2011/0137803 A1 | 6/2011 | Willins | |
| 2011/0307342 A1 | 12/2011 | Haji | |
| 2012/0084391 A1 | 4/2012 | Patel | |
| 2012/0290609 A1 | 11/2012 | Britt | |
| 2013/0006776 A1* | 1/2013 | Miller et al. | 705/14.65 |
| 2013/0159090 A1* | 6/2013 | Boal | 705/14.38 |
| 2013/0246273 A1* | 9/2013 | Ovick | G06Q 20/045 705/44 |

* cited by examiner

*Primary Examiner* — Maria C Santos-Diaz
(74) *Attorney, Agent, or Firm* — Bryan Cave Leighton Paisner LLP

(57) ABSTRACT

A method is disclosed for reprinting a receipt. Where a customer has elected to receive electronic receipts, an electronic receipt may be received on a mobile electronic device following a customer purchase or other transaction at a brick and mortar retail store. Where a customer requests that the receipt be reprinted at the time of the transaction, the election to receive electronic receipts is overridden and a paper copy of the receipt is printed at the register or terminal where the transaction was completed.

20 Claims, 9 Drawing Sheets

REPRINTING A PAPER RECEIPT WHERE AN ELECTRONIC RECEIPT WAS ORIGINALLY ISSUED

BACKGROUND

Field of the Invention

This invention relates to receipts and receipt management systems and more particularly to an approach for reprinting a full paper receipt in a brick and mortar store a short time after issuance of a receipt where an electronic receipts was originally issued.

Background of the Invention

Many point-of-sale (POS) systems currently in use today do not support important emerging technologies. For example, current POS systems are limited in their ability to handle electronic receipts and to facilitate management of receipts for transactions which generated electronic receipts. As a result, the adoption of electronic receipts is hindered or prevented by the inability to provide desired functionality associated with an electronic receipt. Accordingly, what is needed is a system and method for facilitating use of electronic receipts in new novel ways. As will be seen, the invention provides such an approach in an elegant manner.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the embodiments, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, a novel approach is provided for managing receipts and in particular for reprinting a paper receipt where an electronic receipt was originally issued for a transaction.

In selected embodiments, a customer may utilize a mobile electronic device, such as a smart phone or tablet. An electronic receipt may be displayed or managed on the mobile electronic device and the device may include software which allows the customer to manage receipts and share receipts. The software may allow the customer to interface with the electronic receipt, with the POS system, and with a back office/supervisory receipts management system. A customer with electronic receipts software will typically create a user account with a store. This user account will typically be associated with the customer's mobile electronic device, and may also be associated with other customer information, such as a customer's credit card information.

Figure 1:
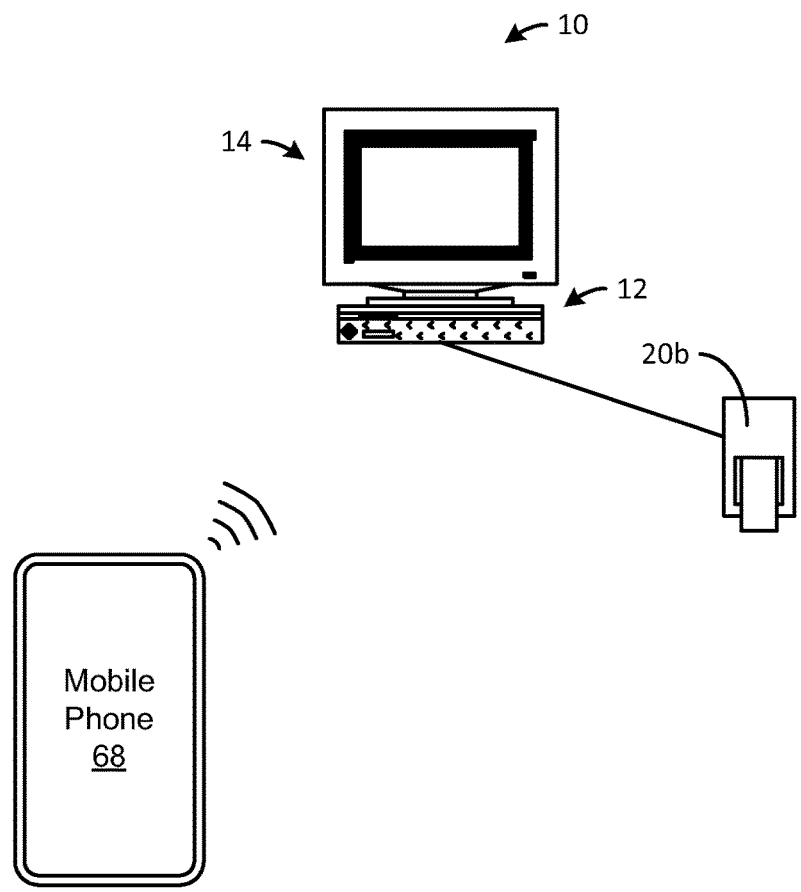
FIG. 1 is a schematic block diagram of an electronic device and a point-of-sale (POS) system having the capability to allow reprinting and management of electronic receipts.

As illustrated in FIG. 1, a customer may complete a transaction at a POS terminal 10 (point of sale terminal, i.e. a cash register) at brick and mortar retail store. The transaction may be a purchase, return, etc. The customer has created an account with the store and has installed electronic receipts software on a mobile electronic device 68. As such, the customer will receive an electronic receipt on the mobile electronic device 68 instead of a paper receipt. In delivering an electronic receipt to the customer, a notification may be sent to the mobile electronic device 68 informing the customer that an electronic receipt is available for download and providing a way for the customer to download the electronic receipt to the mobile device 68. The mobile electronic device 68 may store various electronic receipts and allow the customer to view and manage these receipts. In delivering an electronic receipt to the customer, the receipt printer 20b associated with the POS terminal may print a stub receipt for the customer. The stub receipt may be very short. Often, the stub receipt is only a few lines long and may inform the customer that an electronic receipt has been sent to the mobile electronic device 68.

In some cases, the customer may desire a paper receipt even though they typically prefer electronic receipts. The customer may need a paper receipt to provide to an accountant, work reimbursement, etc. A customer who desires a paper receipt often realizes this when the electronic receipt is created. The printing of a stub receipt or the notification to the customer's mobile electronic device 68 of an electronic receipt often reminds the customer that they needed a paper receipt. In this situation, the POS terminal 10 may be used to reprint the electronic receipt as a paper receipt. Many POS terminals 10 will have a 'reprint last receipt' button. This may be a button on the POS terminal 10 (which may be a digital button on a touch screen) or on the receipt printer 20b. The POS terminal 10 may be configured such that pressing the 'reprint last receipt' button overrides the electronic receipt delivery settings associated with the customer's account with the store and causes a paper copy of the receipt to be printed. This receipt may be given to the customer.

In general, the purpose of a receipts management system is to facilitate the handling of receipts in a manner which is convenient to the customer. Many challenges arise in using electronic receipts. In particular, the use of electronic receipts may create challenges when a customer needs to perform subsequent receipt management functions such as providing a receipt to their work or to another person such as an accountant. Various parts of a receipts management system may facilitate reprinting a paper receipt where an electronic receipt was originally created. Various parts of a receipts management system are described to illustrate how these may allow a customer to manage electronic receipts, and more particularly to reprint a paper receipt when needed.

In certain embodiments, a machine-readable code may be used to interact between the customer's mobile electronic device, receipts, a receipts management server, and/or the POS system. The machine readable code may comprise a conventional barcode or a two-dimensional barcode (e.g., a Quick Response (QR) Code). The data encoded within a machine-readable code may vary between different embodiments and different purposes or goals of the embodiment. In selected embodiments, a machine-readable code may encode a transaction identification (ID) uniquely identifying a particular transaction (e.g., purchase, return, or the like). Alternatively, or in addition thereto, a machine-readable code may encode data regarding the POS terminal and/or the store where the terminal is located. A machine readable code may facilitate the installation of electronic receipts software by the customer or other persons known to the customer. In some embodiments, a machine readable code may be accompanied by an alpha-numeric code.

Embodiments in accordance with the invention may be embodied as an apparatus, system, device, method, computer program product, or other entity. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of embodiments described herein may be written in any combination of one or more programming languages, including an object-oriented programming language such as Java, Smalltalk, C++, or the like and conventional procedural programming languages, such as the "C" programming language or similar programming languages. The program code may execute entirely on a computer of a point-of-sale (POS) system, partly on a POS computer, as a stand-alone software package, on a stand-alone hardware unit, partly on a remote computer spaced some distance from the POS computer, or entirely on a remote computer or server. In the latter scenario, the remote computer may be connected to the POS computer through any type of network, including a local area network (LAN) or a wide area network (WAN), or the connection may be made to an external computer (e.g., through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
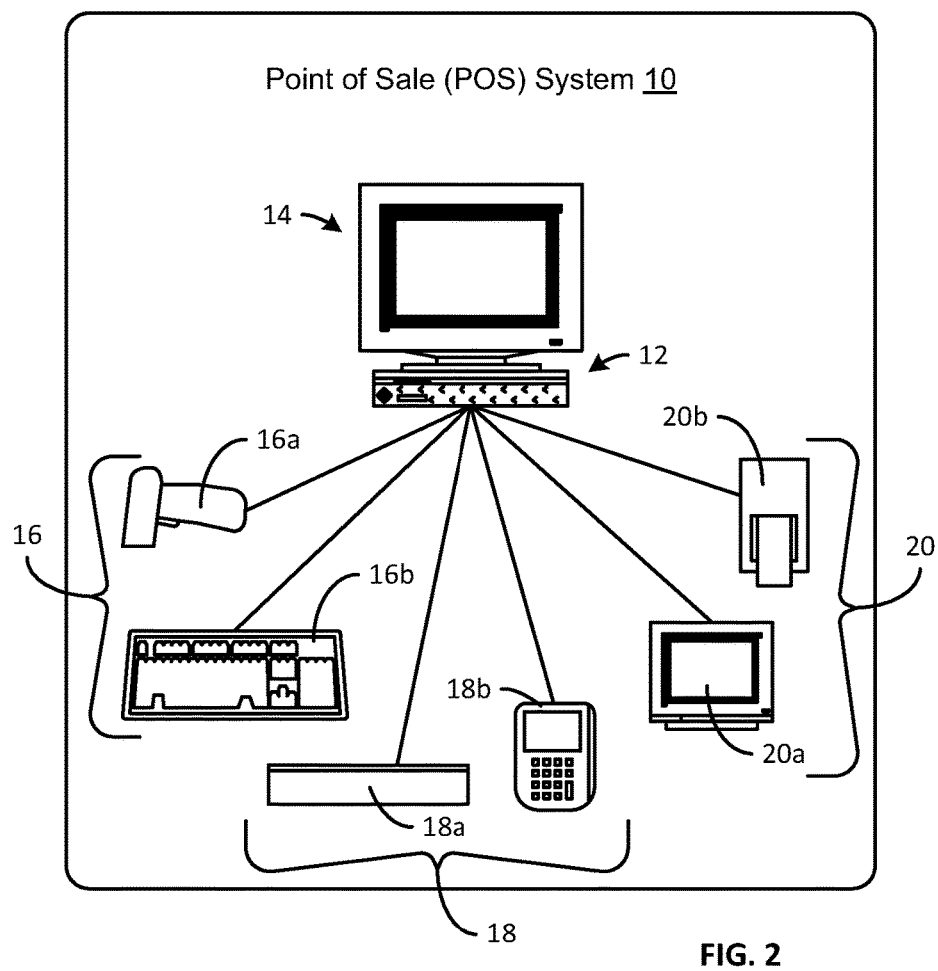
FIG. 2 is a schematic block diagram of one embodiment of a POS system.

Referring to FIG. 2, in selected embodiments, the hardware, software, or hardware and software of a POS system 10 may be configured to implement one or more methods in accordance with embodiments described herein. For example, a POS system 10 may be manufactured, programmed, modified, or upgraded to support providing electronic receipts to customers and to facilitate subsequent management of the receipt. In particular, a POS system may allow a customer to reprint a paper receipt where an electronic receipt was printed and thereby provide receipt information to other persons such as work, an accountant, etc. In discussing the present system, it is appreciated that the system may involve one or more parts of a local POS terminal and associated computers or servers, remote computers or servers, customer devices such as a mobile electronic device, and associated equipment.

A POS system 10 may include various components. In certain embodiments, a POS system 10 may include a central or primary computer 12, a monitor 14 (e.g., a cashier-facing monitor 14), one or more input devices 16 (e.g., scanners 16a, keyboards 16b, scales, or the like), one or more payment devices 18 (e.g., cash drawers 18a, card readers 18b) for receiving or returning payments, one or more output devices 20 (e.g., customer-facing display 20a or monitor 20a, receipt printer 20b), or the like or combinations or sub-combinations thereof.

A computer 12 may form the primary processing unit of a POS system 10. Other components 16, 18, 20 forming part of a POS system 10 may communicate with the computer 12. Input devices 16 and certain payment devices 18 may feed data and commands to a computer 12 for processing or implementation. For example, a scanner 16a may pass data communicating the identity of one or more items to be purchased, returned, or the like to a computer 12. Similarly, a card reader 18b may pass payment information to a computer 12.

Conversely, output devices 20 and certain payment devices 18 may follow or implement commands issued by a computer 12. For example, a cash drawer 18a may open in accordance with the commands of a computer 12. Similarly, a customer-facing display 20a and receipt printer 20b may display or output data or information as instructed by a computer 12.

In selected embodiments, in addition to handling consumer transactions (e.g., purchases, returns), a POS system 10 may also provide or support certain "back office" functionality. For example, a POS system 10 may provide or support inventory control, purchasing, receiving and transferring products, or the like. A POS system 10 may also store sales and customer information for reporting purposes, marketing purposes, receivables management, trend analysis, cost analysis, price analysis, profit analysis, or the like. If desired or necessary, a POS system 10 may include an accounting interface to pass certain information to one or more in-house or independent accounting applications. A POS system 10 may also communicate with third parties and may transmit receipt information and facilitate customer management of receipts.

Figure 3:
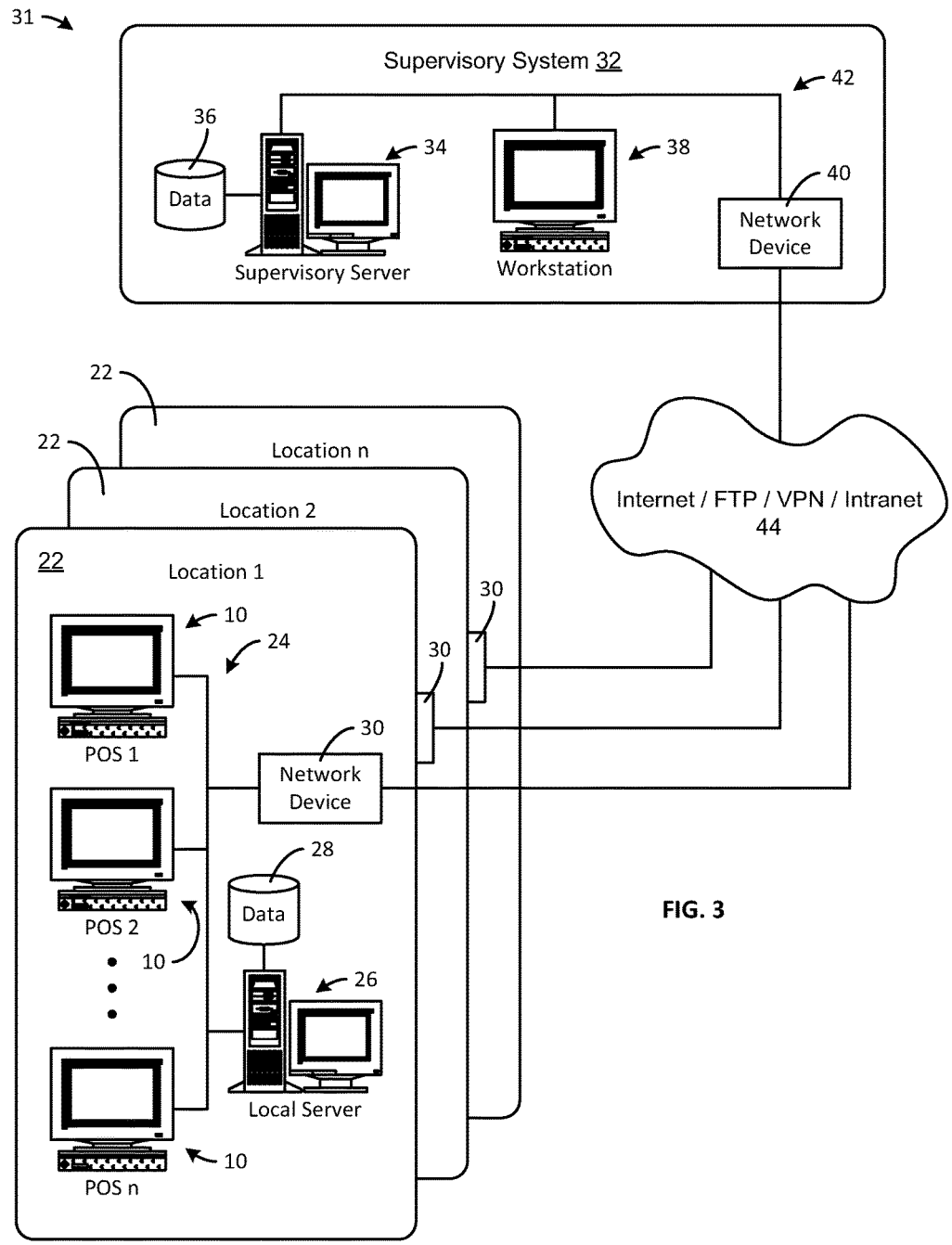
FIG. 3 is a schematic block diagram of one embodiment of multiple POS systems operating in the context of an enterprise-wide system.

Referring to FIG. 3, in selected embodiments, a POS system 10 may operate substantially independently, as a stand-alone unit. Alternately, a POS system 10 may be one of several POS systems 10 forming the front line of a larger system. For example, multiple POS systems 10 may operate at a particular location 22 (e.g., within a retail, brick-and-mortar store). In such embodiments, the various POS systems 10 may be interconnected via a LAN 24. A LAN 24 may also connect the POS systems 10 to a local server 26.

A local server 26 may support the operation of the associated POS systems 10. For example, a server 26 may provide a central repository from which certain data needed by the associated POS systems 10 may be stored, indexed, accessed, or the like. A server 26 may serve certain software to one or more POS systems 10. In certain embodiments, a POS system 10 may offload certain tasks, computations, verifications, or the like to a server 26.

Alternatively, or in addition thereto, a server 26 may support certain back office functionality. For example, a server 26 may receive and compile (e.g., within one or more associated databases 28) data from the various associated POS systems 10 to provide or support inventory control, purchasing, receiving and transferring products, or the like.

A server 26 may also receive and compile sales and customer information for reporting purposes, marketing purposes, receivables management, trend analysis, cost analysis, price analysis, profit analysis, or the like.

In certain embodiments, one or more POS systems 10 or servers 26 corresponding to a particular location 22 may communicate with or access one or more remote computers or resources via one or more network devices 30. For example, a network device 30 may enable a POS system 10 to contact outside resources and verify the payment credentials (e.g., credit card information) provided by a customer. A network device 30 may comprise a modem, router, or the like.

In selected embodiments, a POS system 10 may operate within an enterprise-wide system 31 comprising multiple locations 22 (e.g., branches 22 or stores 22). In such embodiments, each location 22 may have one or more POS systems 10, local servers 26, local databases 28, network devices 30, or the like or combinations or sub-combinations thereof connected by a computer network (e.g., a LAN 24). Additionally, each such location 22 may be configured to interact with one or more supervisory systems 32. For example, multiple branch locations 22 may report to an associated "headquarters" location or system 32.

A supervisory system 32 may comprise one or more supervisory servers 34, databases 36, workstations 38, network devices 40, or the like or combinations or sub-combinations thereof. The various components of a supervisory system 32 may be interconnected via a computer network (e.g., a LAN 42). In selected embodiments, a supervisory system 32 may comprise one or more supervisory servers 34 providing a central repository from which certain data needed by the one or more POS systems 10 or local servers 26 may be stored, indexed, accessed, or the like.

Alternatively, or in addition thereto, a supervisory server 34 may receive and compile (e.g., within one or more associated databases 36) data from the various associated POS systems 10 or local servers 26 to provide or support inventory control, purchasing, receiving and transferring products, or the like. A supervisory server 34 may also receive and compile sales and customer information for reporting purposes, marketing purposes, receivables management, trend analysis, cost analysis, price analysis, profit analysis, or the like.

A supervisory system 32 may be connected to one or more associated locations 22 or branches 22 in via any suitable computer network 44 (e.g., WAN 44). For example, in selected embodiments, one or more locations 22 may connect to a supervisor system 32 via the Internet. Communication over such a network 44 may follow any suitable protocol or security scheme. For example, communication may utilize the File Transfer Protocol (FTP), a virtual private network (VPN), intranet, or the like.

The supervisory server 34 may also promote communications with a customer. For example, the supervisory server 34 may provide functionality as a receipts management server and may receive, store, prepare, and transmit receipt information to a customer. The server 34 may transmit an electronic receipt to a mobile electronic device 68. The supervisory server 34 may also receive and store information regarding a customer, such as by storing customer account information associated with the use and receipt of electronic receipts.

It is thus appreciated that in discussing the functionality of the various POS terminals and servers, the embodiments described herein may be implemented in a system contained within a single location or across multiple locations. By way of example, the functionality accomplished by a server or computer, such as storing, processing, and transmitting/sending receipt information, may be accomplished by a local computer or a remote computer such as servers 26 and 34.

Figure 4:
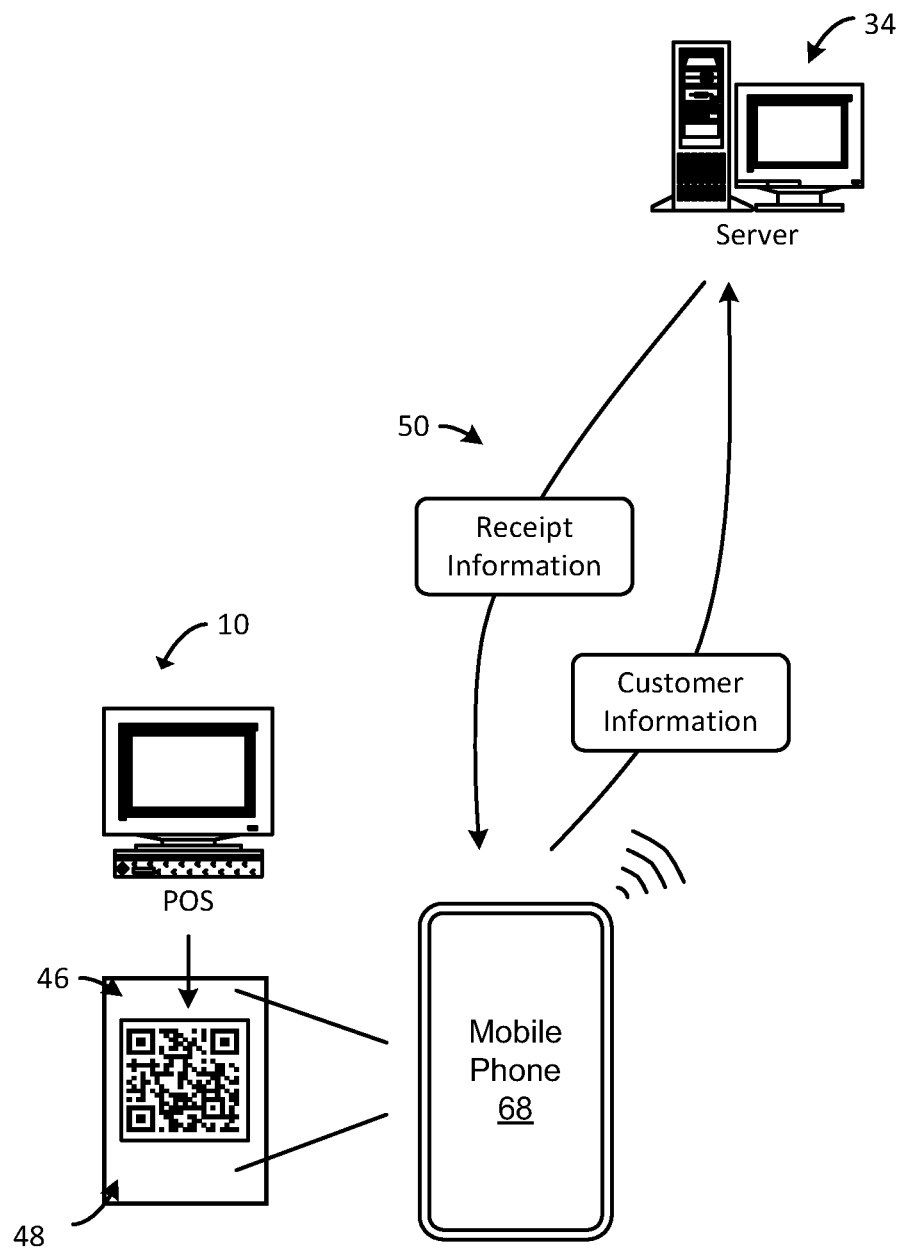
FIG. 4 is a block diagram illustrating the flow of data within one embodiment.

Referring to FIG. 4, a customer may download or may already have downloaded electronic receipts software to a mobile electronic device 68. The mobile electronic device 68 may be a smart phone, tablet PC, etc. A customer may have previously received a paper receipt 46 from a POS terminal 10 or another item which includes an invitation to use electronic receipts instead of paper receipts. The invitation to use electronic receipts may comprise a machine readable code 48 such as a QR code. The customer may have scanned the QR code to download electronic receipts software to the mobile electronic device 68 and may have created a user account with a receipts management server 34.

As indicated at 50, the customer may have an account with the receipts management server 34 and may transmit information to the server 34. The reprinting of a receipt may occur in instances where a customer does not have an account with the receipts management server 34 and having such an account is not strictly necessary. In creating an account with the receipts management server, the customer may have established a user profile which includes user preferences. The account may identify an electronic device 68, such as by the telephone number of a smart phone 68. The account may also contain information to identify the user when a transaction is made at a store. The account may identify a credit card which the user desires to associate with their account. This identification may cause an electronic receipt to be sent to the customer's mobile electronic device 68 when a purchase is made with the associated credit card. Other modes of identifying a customer/customer account when a purchase is made. For example, the customer could capture a QR code at a POS terminal 10 with a camera on their mobile electronic device 68 or a POS terminal scanner 16a could capture a QR code on the customer's mobile electronic device 68 when the customer is making a purchase to identify the customer account and associate it with that purchase.

The receipts management server 34 may likewise transmit information to the mobile device 68. The customer may receive electronic receipts on the mobile device 68 when a purchase is made and the electronic receipts software on the mobile device 68 may enable the customer to manage electronic receipts. Additionally, the electronic receipts software may allow the customer to interact with a POS system 10 via the mobile electronic device 68.

Figure 5:
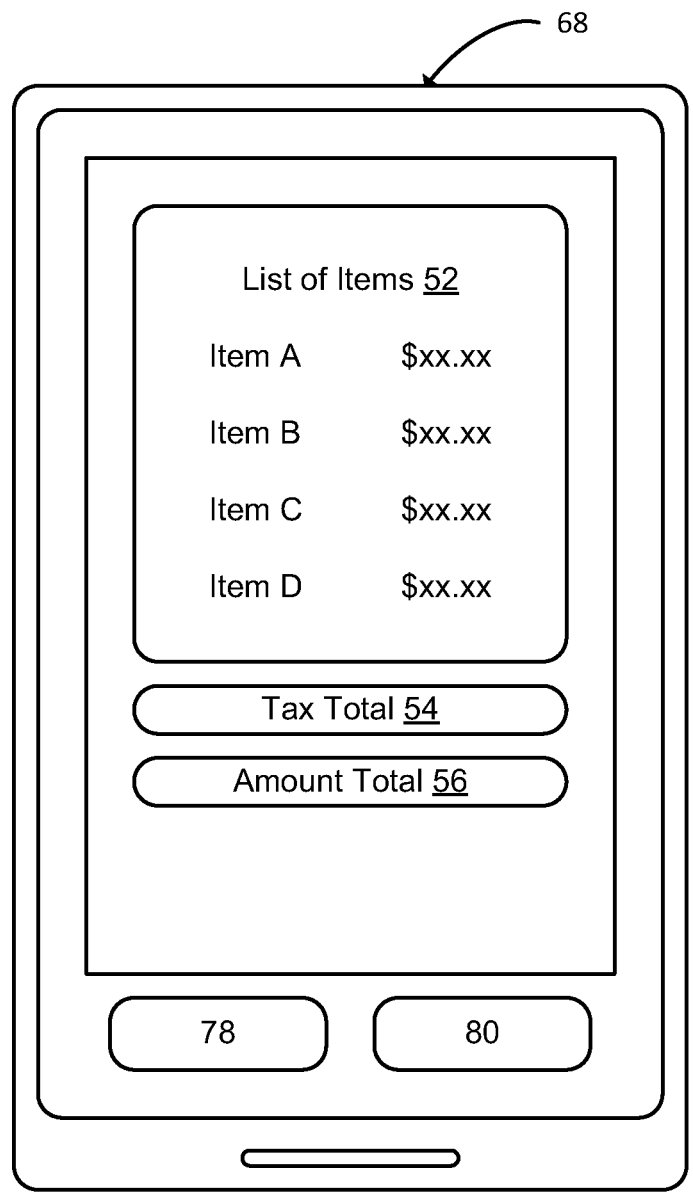
FIG. 5 is a schematic block diagram of one embodiment of a receipt viewed on a mobile electronic device.

Referring to FIG. 5, the mobile electronic device 68 may display an electronic receipt 74 to the customer in a manner similar to the appearance of a paper receipt 46. The electronic receipts software on the mobile electronic device 68 allows a person to view their electronic receipts and to manage their receipts in many ways similar to a paper receipt. The software may provide menus, commands, or virtual buttons 78, 80 to the customer to facilitate completion of the various steps for managing electronic receipts which are discussed herein.

The electronic receipt 74 may be presented to a customer in a manner which is similar to a paper receipt 46. The electronic receipt 74 may include a store logo and contact information, a list 52 of items purchased or returned, a total 54 indicating the sales tax assessed or returned, a total 56 indicating 56 the amount paid or returned, payment information, a machine readable code 76 identifying the transaction, and other information as desired, as well as combinations or sub-combinations thereof.

A machine-readable code 76 may comprise a barcode. For example, in certain embodiments, a machine-readable code 76 may comprise a conventional barcode or a two-dimensional barcode such as a QR code. Two-dimensional barcodes may support or provide more data per unit area than can be obtained using a traditional one-dimensional barcode. Moreover, two-dimensional barcodes are typically configured to be captured using a camera, an item that is commonly found on personal electronic devices. A two-dimensional barcode may follow any suitable protocol, format, or system. In selected embodiments, a two-dimensional code may be embodied as a Quick Response (QR) Code.

As regards the management of electronic receipts, the data encoded within a machine-readable code 76 may encode a transaction identification (ID). A transaction ID may uniquely identify a particular transaction (e.g., a transaction documented by a corresponding receipt 74). The machine-readable code 76 may include a data hash or encrypted or encoded information describing the purchase transaction. For example, the code 76 may contain the store and POS terminal where the transaction occurred, the time of the transaction, the total price of the transaction, etc. With such information, a receipt and associated transaction may be positively identified for management and further use of then receipt.

Figure 6:
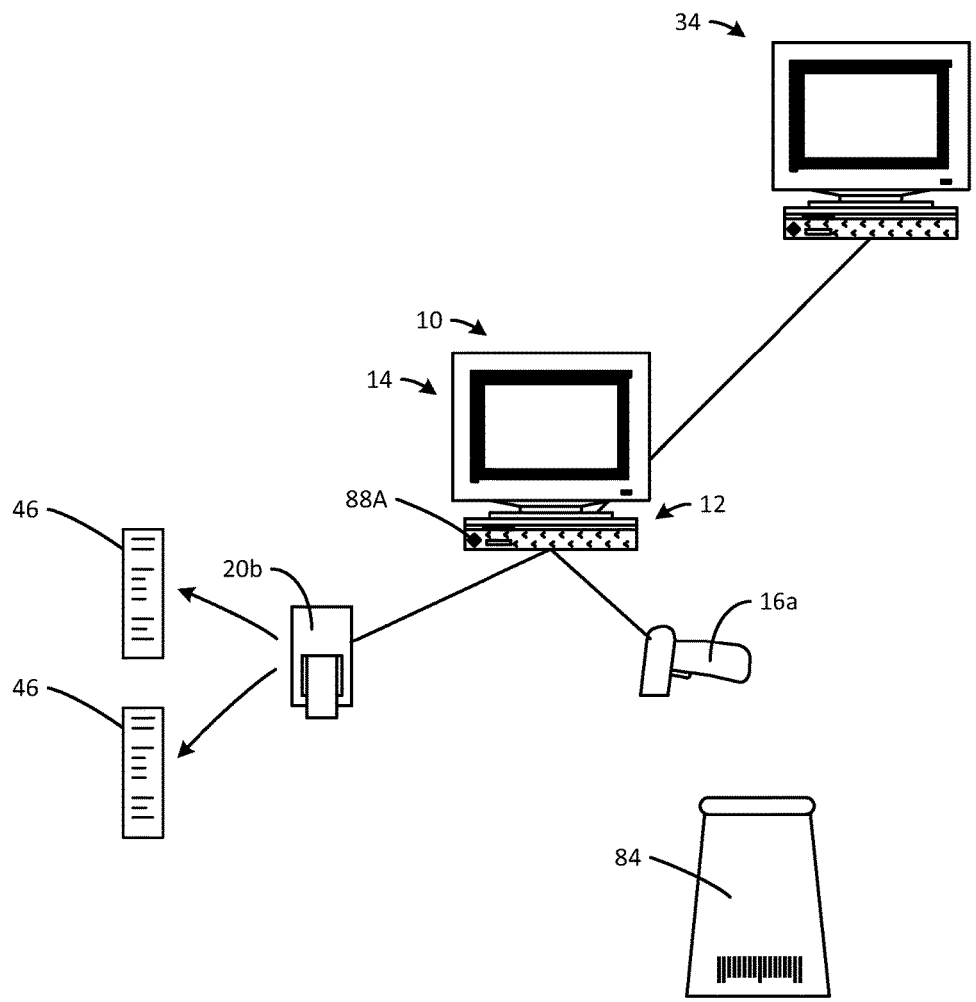
FIG. 6 is a schematic block diagram of one embodiment.

Referring to FIG. 6, a first customer may complete a transaction at a brick and mortar retail store. The customer may bring one or more items 84 to the POS terminal 10 to complete a purchase or other transaction. The items 84 will be scanned into the POS terminal 10, such as by scanner 16a. This process may proceed regardless of whether the customer is at a conventional POS terminal 10 with a sales associate or a self-checkout POS terminal. The customer will typically proceed to complete the transaction.

As the transaction proceeds, the POS terminal 10 may communicate with a receipts management server 34. This customer does not have an account with the receipt management server 34 and does not have electronic receipts software on a mobile electronic device as previously discussed. Accordingly, the POS terminal 10 may provide a paper receipt 46 to the customer. The POS terminal 10 may communicate with the server 34 to provide information regarding the transaction and receipt 46.

A receipt printer 20b at the POS terminal may print a receipt 46 for the customer. In some cases, this customer may need a second copy of the paper receipt 46. The POS terminal may include a 'reprint last receipt' button 88A. This button 88A may be a part of the POS terminal 10 or may be part of the receipt printer 20b, and may be a physical button or a virtual button created by software on the POS terminal 10. The cashier may press the 'reprint last receipt' button 88A to repeat the previous receipt command and print another copy of the paper receipt 46 for the customer.

Figure 7:
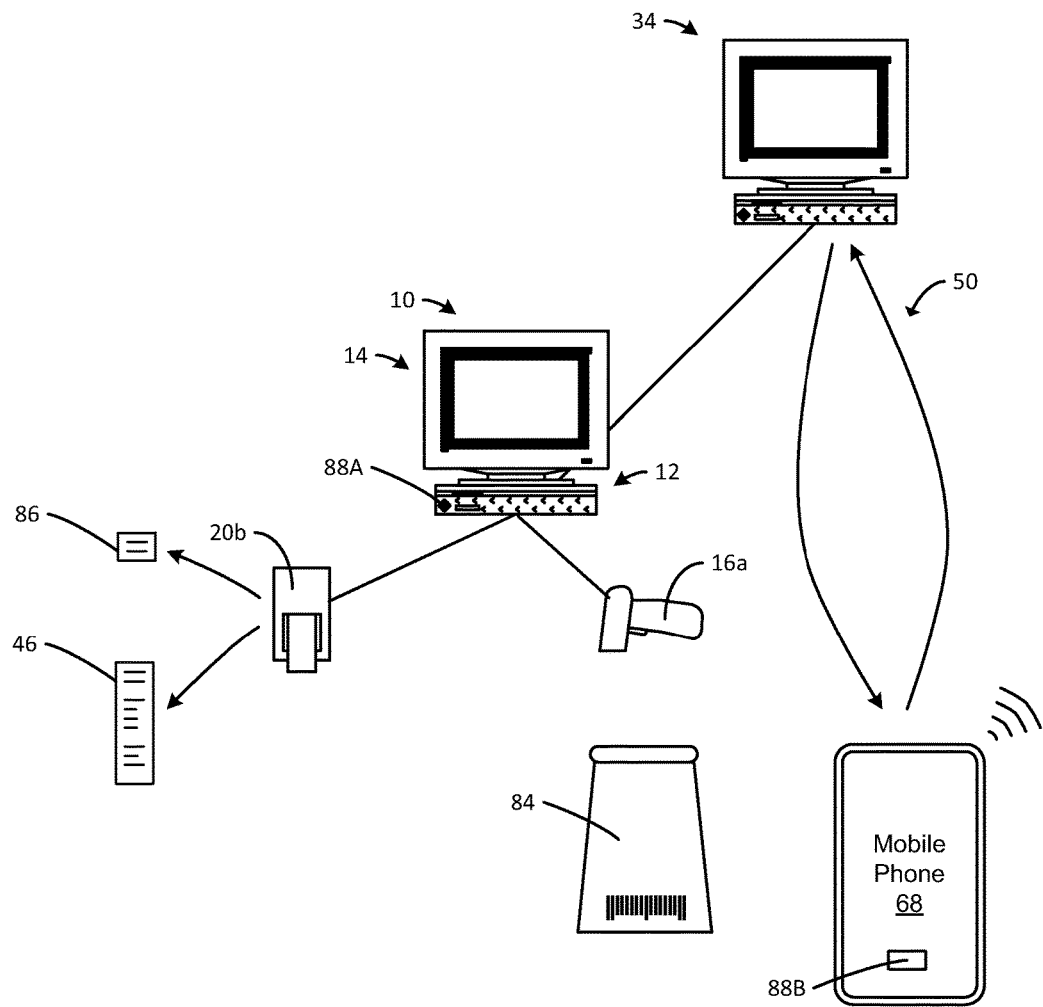
FIG. 7 is a schematic block diagram of one embodiment.

Referring to FIG. 7, a second customer may complete a transaction at the same brick and mortar retail store and the same POS terminal 10. The customer will bring one or more items 84 to a POS terminal 10 to complete a purchase or other transaction. The items 84 will be scanned into the POS terminal 10, such as by scanner 16a.

As the transaction proceeds, the POS terminal 10 communicates with a receipts management server 34. The customer may have an account with the receipt management server 34 and may have electronic receipts software on a mobile electronic device 68. In accordance with account settings, the receipts management server 34 may provide an electronic receipt to the customer instead of a paper receipt. As discussed, the server 34 may communicate 50 with the mobile electronic device 68 to provide the receipt. The server 34 may provide a notification to the electronic device 68 indicating that a new electronic receipt is available and inviting the customer to accept the receipt.

The receipt printer 20b at the POS terminal may print a stub receipt 86 for the customer, indicating that an electronic receipt has been prepared for this transaction and sent to the mobile electronic device 68. In some cases, the customer may need a paper receipt instead of or in addition to the electronic receipt. The customer may need to submit a copy of the receipt for reimbursement, warrantee, accounting purposes, etc. In these situations, the customer may not remember to request a paper receipt until the transaction has been completed. Frequently, receiving an electronic receipt 74 or a stub receipt 86 reminds the customer that they need a paper receipt for this transaction.

To accommodate this situation, the POS terminal 10 may be configured to expeditiously provide a paper receipt copy to the customer. In this situation, the 'reprint last receipt' button 88A may be used. Rather than simply repeating the previous receipt issuance (i.e. reissuing another electronic receipt to the customer for this transaction), the 'reprint last receipt' button 88A may be configured to override the electronic receipt settings in the user account and print a paper receipt 46 corresponding to the transaction so that this may be provided to the customer. The 'reprint last receipt' button may be configured to communicate with the server 34 to indicate that a paper copy 46 of the electronic receipt 74 had been printed, but would not communicate with the receipts management server 34 to request reissuance of the electronic receipt 74 in the same manner as previous.

Additionally, the mobile electronic device 68 may be provided with a button 88B to print a paper copy of the receipt. Upon completion of the transaction, the receipts management server 34 typically sends the customer a notification that an electronic receipt is available. This notification is sent to the mobile electronic device 68. The notification typically contains a digital button to close the notification and a digital button to view the electronic receipt. The electronic receipts software may also provide a digital button 88B to print a paper copy of the receipt. If the customer presses the paper reprint button 88B, the mobile electronic device typically sends a request to the server 34 to request a paper copy 46 of the receipt 74 and the server 34 transmits a request to POS terminal 10 to print a paper copy of the receipt. The POS terminal causes the paper copy 46 of the receipt 74 to be printed at the receipt printer 20b.

It is often desirable that this process of printing a paper copy 46 of an electronic receipt 74 is completed quickly after finishing the original transaction. If a significant amount of time is consumed, the POS terminal 10 is occupied and is unable to assist additional customers. For this reason, the POS terminal button 88A which normally reissues the previous receipt may be programmed to, in the case of an electronic receipt 74, ignore the customer account settings requesting electronic receipts and cause a paper copy 46 of the receipt to be reprinted.

Figure 8:
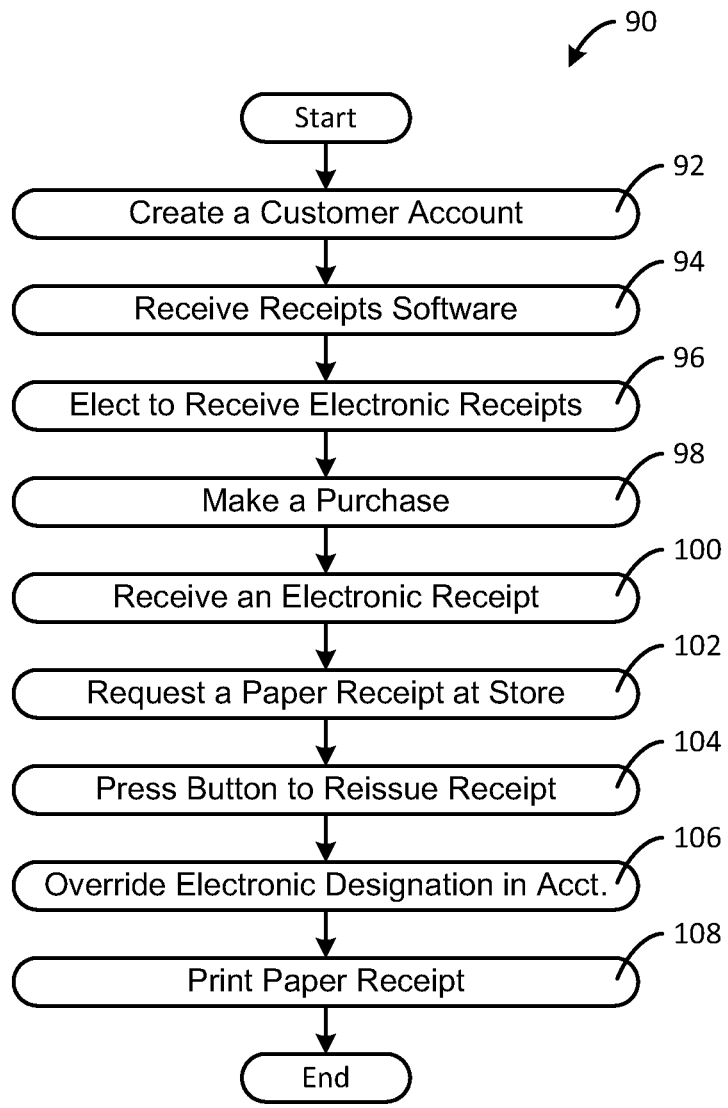
FIG. 8 is a block diagram of one embodiment of a method for reprinting a receipt.

Similarly, the electronic device 68 may be configured to limit the time available to the customer to reprint a paper copy 46 of the electronic receipt. The electronic receipts software may be programmed such that the button 88B to request a paper copy 46 of the receipt 74 is only available for a limited amount of time FIG. 8 generally illustrates a process 90 which may be used to provide a receipt to a customer. A customer may create 92 an account with the receipts management server 34 and obtain 94 software to allow the customer to obtain electronic receipts on a mobile electronic device 68 and to manage receipts on that device. The customer may reprint a receipt as discussed without an account with the receipts management server. The customer, in obtaining 94 electronic receipts software or creating 92 an account with the receipts management server 34 will typically elect 96 to receive electronic receipts instead of receiving paper receipts while shopping at the store.

The customer may then make a purchase 98 at a local brick and mortar store. The purchase may include one or more items. After making a purchase, the customer will typically receive 100 an electronic receipt 74 according to their election to receive electronic receipts from the store. The electronic receipt 74 is typically sent to the customer's mobile electronic device 68 from a receipts management server 34. The customer may determine that, for this particular transaction, they need a paper copy of the electronic receipt. Accordingly, the customer may request 102 a paper copy of the receipt from the cashier at the POS terminal 10 where the transaction was completed. A button 88A may be pressed 104 on the POS terminal 10, requesting that the terminal reprint the last receipt. This button may often be pressed by a sales associate or cashier working at the POS terminal 10.

Rather than simply reissuing the last receipt, the POS terminal may, without any further input, automatically override 106 the customer's designation with the store to receive electronic receipts and cause a paper copy of the electronic receipt to be created and printed 108 at the receipt printer 20b associated with the POS terminal 10.

Figure 9:
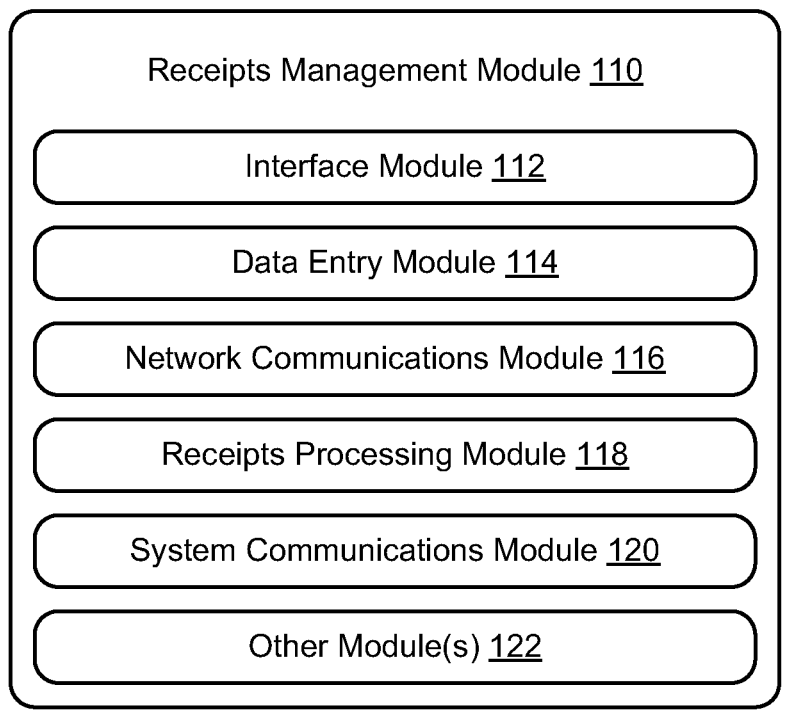
FIG. 9 is a schematic block diagram of one embodiment of a receipts sharing module.

Referring to FIG. 9, a computer system may include a receipts printing module 110. The various functions or modules of a receipts printing module 110 may be enacted or implemented by any suitable system or component thereof. For example, in selected embodiments, one or more functions or modules of a receipts printing module 110 may be distributed across one or more hardware devices, including a mobile electronic device 68, a primary computer 12 of a POS system 10, a local server 26, a supervisory server 34, some other onsite resource, some other offsite resource, or the like or combinations or sub-combinations thereof. Thus, different embodiments may be adapted to a wide variety of situations, including more rigid legacy systems.

In selected embodiments, a receipts printing module 110 facilitates the receipts printing process described herein. The receipts printing module may include any suitable arrangement of sub-components or modules. The receipts printing module 110 may include an interface module 112 which interfaces with a customer. The interface module may include a display on a mobile electronic device 68. The receipts printing module 110 may also include a data entry module 114 which may include a keypad or touchscreen on a mobile electronic device 68, and which allows the customer to enter data associated with a customer profile or to otherwise manage a receipt. The receipts printing module 110 may include a network communications module 116 which may facilitate communications between the mobile electronic device 68, and the server 26, 34.

The receipts printing module 110 may include a receipts processing module 118 which may include a server 34 and which may facilitate processing receipts and preparing electronic receipts for delivery to a customer. The receipts processing module 118 may also include a POS terminal 10 which may process and prepare receipts. When the POS terminal is requested to reissue or 'reprint' a receipt, the POS terminal 10 may override a customer's account setting to receive electronic receipts and may prepare and/or print a paper copy of a receipt for a customer. The receipts printing module 110 may include a system communications module 120 which may communicate between a server 26, 34, a POS terminal 10, a mobile electronic device 68 and a customer. The receipts printing module 110 may also include other modules 122 as are desirable to implement various embodiments. The various modules and parts of the receipts printing module 110 may include hardware, firmware and software components as are desirable for various embodiments and to achieve the various steps, features, and functionality discussed herein.

The flowchart and block diagrams of the Figures illustrate the architecture, functionality, and operation of possible implementations of systems, methods, and computer program products according to one or more embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for printing electronic receipts comprising:
receiving, by a receipts management server, a selection, from an electronic receipts software residing in at least one of one or more mobile electronic devices of a user, to receive the electronic receipts on the at least one of the one or more mobile electronic devices:
wherein the electronic receipts software is (a) downloaded by the user to the at least one of the one or more mobile electronic devices by at least scanning a QR code associated with the electronic receipts software associated with one or more brick and mortar retail stores, or (b) downloaded to the at least one of the one or more mobile electronic devices from the receipts management server;
wherein the electronic receipts software allows the user to interact with a Point of Sale ("POS") terminal of at least one of the one or more brick and mortar retail stores; and
wherein the electronic receipts software creates a rule for the user to receive and manage the electronic receipts, based on the selection to receive the electronic receipts on the at least one of the one or more mobile electronic devices, through the receipts management server;
generating, by the receipts management server, a user account associated with the user including the selection to receive the electronic receipts, credit card information associated with the user, and identifying information associated with the at least one of the one or more mobile electronic devices;
storing, by the receipts management server, the user account in a user database, wherein the electronic receipts software tracks the user account associated with the user with the at least one of the one or more brick and mortar retail stores;
receiving, by the receipts management server, from the POS terminal, transaction information associated with a transaction with the user at the POS terminal at the at least one of the one or more brick and mortar retail stores, the transaction information comprising the credit card information used during the transaction;
generating, by the receipts management server, an electronic receipt of the electronic receipts based on the transaction information, as received, including data associated with the transaction and the POS terminal;
accessing the user database and selecting, by the receipts management server, the user account comprising the credit card information, as received;
determining, by the receipts management server, when the user account includes the selection to receive the electronic receipts;
identifying, by the receipts management server, the at least one of the one or more mobile electronic devices associated with the user account upon determining that the user account includes the selection to receive the electronic receipts;
issuing, by the receipts management server, the electronic receipt for the transaction to the at least one of the one or more mobile electronic devices for use by the electronic receipts software installed on the at least one of the one or more mobile electronic devices;
printing, by the receipts management server, a stub receipt at the POS terminal including an issuance notification that the electronic receipt has been issued to the at least one of the one or more mobile electronic devices;
rendering, by the electronic receipts software on the at least one of the one or more mobile electronic devices, images including a delivery notification indicating that the electronic receipt has been delivered to the at least one of the one or more mobile electronic devices, the images including a digital button for a request for an override to print a paper copy of the electronic receipt, wherein the electronic receipts software causes the at least one of the one or more mobile electronic devices to communicate with the receipts management server;
detecting, by the electronic receipts software, the selection by the user of the digital button indicating the request for the override to print the electronic receipt and transmitting a signal to the receipts management server including the request for the override from the user to print the paper copy of the electronic receipt;
receiving, by the receipts management server, the request by the user for the override from the at least one of the one or more mobile electronic devices containing the electronic receipts software;
overriding, by the receipts management server, the rule allowing the user to receive the electronic receipts included in the user account and transmitting the request for the override to print the paper copy of the electronic receipt to the POS terminal upon receiving the request for the override to print the paper copy of the electronic receipt from the electronic receipts software; and printing, by the POS terminal, the paper copy of the electronic receipt at the POS terminal in response to receiving the request.

2. The method of claim 1, wherein the method further comprises receiving, by the receipts management server, a signal from the POS terminal indicative of pressing a button on the POS terminal to request that the electronic receipt be reissued and the paper copy of the electronic receipt be printed.

3. The method of claim 1, wherein the method further comprises rendering an image of a reprint button on the POS terminal to initiate the printing of the paper copy of the electronic receipt.

4. The method of claim 1, wherein the electronic receipt includes a machine readable code including data associated with a location of the POS terminal.

5. The method of claim 4, wherein the method further comprises printing the paper copy of the electronic receipt upon determining that a different user account of a different user does not include the rule for the different user to receive the electronic receipts.

6. The method of claim 4, wherein the images include an option to view the electronic receipt on the at least one of the one or more mobile electronic devices.

7. The method of claim 1, wherein printing the paper copy of the electronic receipt is available following delivery of the delivery notification to the at least one of the one or more mobile electronic devices.

8. The method of claim 1, wherein the transaction information includes the QR code associated with the electronic receipts software by the POS terminal from the at least one of the one or more mobile electronic devices including information used to identify a corresponding user account associated with the user.

9. A method for printing electronic receipts comprising:
receiving, by a receipts management server, a selection, from an electronic receipts software residing in at least one of one or more mobile electronic devices of a user, to receive the electronic receipts on the at least one of the one or more mobile electronic devices:
wherein the electronic receipts software is (a) downloaded by the user to the at least one of the one or more mobile electronic devices by at least scanning a QR code associated with the electronic receipts software associated with one or more brick and mortar retail stores, or (b) downloaded to the at least one of the one or more mobile electronic devices from the receipts management server;
wherein the electronic receipts software allows the user to interact with a Point of Sale ("POS") terminal of at least one of the one or more brick and mortar retail stores; and
wherein the electronic receipts software creates a rule for the user to receive and manage the electronic receipts, based on the selection to receive the electronic receipts on the at least one of the one or more mobile electronic devices, through the receipts management server;
generating, by the receipts management server, a user account associated with the user including the selection to receive the electronic receipts, credit card information associated with the user, and identifying information associated with the at least one of the one or more mobile electronic devices;
storing, by the receipts management server, the user account in a user database, wherein the electronic receipts software tracks the user account associated with the user with the at least one of the one or more brick and mortar retail stores;
receiving, by the receipts management server, transaction information associated with a transaction with the user at the POS terminal at the at least one of the one or more brick and mortar retail stores, the transaction information comprising the credit card information used during the transaction;
generating, by the receipts management server, an electronic receipt including data associated with the transaction and the POS terminal;
storing, by the receipts management server, the electronic receipt in the user database;
accessing the user database and selecting, by the receipts management server, the user account comprising the credit card information, as received;
determining, by the receipts management server, when the user account includes the selection to receive the electronic receipts;
transmitting, by the receipts management server, to the POS terminal, a request for an override to print a paper copy of the electronic receipt for the user who has elected to receive the electronic receipts from the at least one of the one or more brick and mortar stores despite determining that the user account does include the selection to receive the electronic receipts;
printing the paper copy of the electronic receipt at the POS terminal;
issuing the electronic receipt for the transaction to the at least one of the one or more mobile electronic devices associated with the user account, as selected;
printing a stub receipt at the POS terminal including an issuance notification that the electronic receipt has been issued to the at least one of the one or more mobile electronic devices upon determining that the user account, as selected, includes the selection to receive the electronic receipts;
rendering, by the electronic receipts software on the at least one of the one or more mobile electronic devices, images including a delivery notification indicating that the electronic receipt has been delivered to the at least one of the one or more mobile electronic devices, the images including a digital button for the request for the override to print the electronic receipt, wherein the electronic receipts software causes the at least one of the one or more mobile electronic devices to communicate with the receipts management server;
detecting, by the electronic receipts software, the selection by the user of the digital button indicating the request for the override to print the electronic receipt and transmitting a signal to the receipts management server including an instruction to reissue the electronic receipt for the transaction;
receiving, by the receipts management server, the request by the user for the override from the at least one of the one or more mobile electronic devices containing the electronic receipts software;
overriding, by the receipts management server, the rule allowing the user to receive the electronic receipts included in the user account;

transmitting, by the receipts management server, the request for the override to print the electronic receipt to the POS terminal upon receiving the request for the override to reissue the electronic receipt for the transaction from the electronic receipts software; and printing, by the POS terminal, the paper copy of the electronic receipt at the POS terminal in response to receiving the request for the override to reissue.

10. The method of claim 9, wherein the method further comprises receiving, by the receipts management server, a signal from the POS terminal indicative of pressing a button at the POS terminal to request reissuance of the electronic receipt.

11. The method of claim 9, wherein the delivery notification includes an option to view the electronic receipt on the at least one of the one or more mobile electronic devices.

12. The method of claim 9, wherein overriding and transmitting the request for the override to reissue the electronic receipt is only available after delivery of the delivery notification.

13. A method for printing electronic receipts comprising:
receiving, by a receipts management server, a selection, from an electronic receipts software residing in at least one of one or more mobile electronic devices of a user, to receive the electronic receipts on the at least one of the one or more mobile electronic devices:
wherein the electronic receipts software is (a) downloaded by the user to the at least one of the one or more mobile electronic devices by at least scanning a QR code associated with the electronic receipts software associated with one or more brick and mortar retail stores, or (b) downloaded to the at least one of the one or more mobile electronic devices from the receipts management server;
wherein the electronic receipts software allows the user to interact with a Point of Sale ("POS") terminal of at least one of the one or more brick and mortar retail stores; and
wherein the electronic receipts software creates a rule for the user to receive and manage the electronic receipts, based on the selection to receive the electronic receipts on the at least one of the one or more mobile electronic devices, through the receipts management server;
generating and storing, by the receipts management server, a user account associated with the user in a user database including the selection to receive the electronic receipts, credit card information associated with the user, and identifying information associated with the at least one of the one or more mobile electronic devices;
completing a transaction with the user at the POS terminal of the at least one of the one or more brick and mortar retail stores;
transmitting transaction information from the POS terminal to the receipts management server, the transaction information comprising the credit card information used during the transaction;
generating, by the receipts management server, an electronic receipt of the electronic receipts from the transaction information including data associated with the transaction and the POS terminal;
accessing the user database and selecting, by the receipts management server, the user account comprising the credit card information, as received;

determining, by the receipts management server, when the user account includes the selection to receive the electronic receipts;
identifying, by the receipts management server, the at least one of the one or more mobile electronic devices associated with the user account upon determining that the user account includes the selection to receive the electronic receipts;
transmitting, by the receipts management server, the electronic receipt to the at least one of the one or more mobile electronic devices for use by the electronic receipts software installed on the at least one of the one or more mobile electronic devices;
printing, by the receipts management server, a stub receipt at the POS terminal including an issuance notification that the electronic receipt has been issued to the at least one of the one or more mobile electronic devices;
rendering, by the electronic receipts software on the at least one of the one or more mobile electronic devices, images including a delivery notification indicating that the electronic receipt has been delivered to the at least one of the one or more mobile electronic devices, the images including a digital button for a request for an override to print a paper copy of the electronic receipt, wherein the electronic receipts software causes the at least one of the one or more mobile electronic devices to communicate with the receipts management server;
receiving, by the receipts management server, the request by the user for the override from the at least one of the one or more mobile electronic devices, the selection by the user of the digital button indicating the request for the override from the user to print the paper copy of the electronic receipt;
overriding, by the receipts management server, the rule allowing the user to receive the electronic receipts included in the user account;
transmitting, by the receipts management server, the electronic receipt to the POS terminal upon receiving the request for the override from the user to print the paper copy of the electronic receipt from the at least one of the one or more mobile electronic devices; and
printing the paper copy of the electronic receipts at the POS terminal in response to the request for the override from the user.

14. The method of claim 13, wherein the method more specifically comprises receiving the request for the override from the user to print the paper copy of the electronic receipt at a time of the transaction.

15. The method of claim 13, wherein the delivery notification includes an option to view the electronic receipt on the at least one of the one or more mobile electronic devices.

16. The method of claim 15, wherein printing the paper copy of the electronic receipt is available following delivery of the delivery notification.

17. The method of claim 15, wherein printing the paper copy of the electronic receipt is available following the transaction.

18. A system for printing electronic receipts, comprising:
at least one of one or more mobile electronic devices associated with a user and including an electronic receipts software residing in the at least one of the one or more mobile electronic devices of a user configured to render images of the electronic receipts on a display device of the at least one of the one or more mobile electronic devices:
wherein the electronic receipts software is (a) downloaded by the user to the at least one of the one or more mobile electronic devices by at least scanning a QR code associated with the electronic receipts software associated with one or more brick and mortar retail stores, or (b) downloaded to the at least one of the one or more mobile electronic devices from a receipts management server;

wherein the electronic receipts software allows the user to interact with a Point of Sale ("POS") terminal of at least one of the one or more brick and mortar retail stores; and wherein the electronic receipts software creates a rule for the user to receive and manage the electronic receipts, based on a selection to receive the electronic receipts on the at least one of the one or more mobile electronic devices, through the receipts management server;

the POS terminal configured to generate transaction information associated with a purchase transaction associated with the user, the transaction information including at least credit card information used during the purchase transaction, the POS terminal including a printer for printing receipts associated with the purchase transaction; and the receipts management server coupled to the at least one of the one or more mobile electronic devices and the POS terminal, the receipts management server including a memory device and a processor programmed to:

receive a first signal from the at least one of the one or more mobile electronic devices indicating the selection of the user to receive the electronic receipts on the at least one of the one or more mobile electronic devices, a request for an override being initiated by the user using the electronic receipts software;

generate a user account associated with the user upon receiving the selection to receive the electronic receipts;

store the user account in a user database, the user account including the selection to receive the electronic receipts, the credit card information associated with the user, and identifying information associated with the at least one of the one or more mobile electronic devices, the electronic receipts software tracks the user account associated with the user with the at least one of the one or more brick and mortar retail stores;

receive, from the POS terminal, the transaction information associated with the purchase transaction with the user at the POS terminal;

generate an electronic receipt of the electronic receipts based on the transaction information, as received, including data associated with the purchase transaction and the POS terminal;

access the user database and selecting the user account matching the credit card information included with the transaction information, as received;

determine when the user account includes the selection to receive the electronic receipts;

identify the at least one of the one or more mobile electronic devices associated with the user account upon determining that the user account includes the selection to receive the electronic receipts;

issue the electronic receipt for the purchase transaction to the at least one of the one or more mobile electronic devices for use by the electronic receipts software installed on the at least one of the one or more mobile electronic devices;

transmit a stub receipt print request to the POS terminal to cause the POS terminal to print the stub receipt including an issuance notification that the electronic receipt has been issued to the at least one of the one or more mobile electronic devices;

transmit a second signal to the at least one of the one or more mobile electronic devices causing the electronic receipts software to render images on the at least one of the one or more mobile electronic devices including a delivery notification indicating that the electronic receipt has been delivered to the at least one of the one or more mobile electronic devices, the delivery notification including a digital button for the request for the override to print the electronic receipt, wherein the electronic receipts software causes the at least one of the one or more mobile electronic devices to communicate with the receipts management server;

receive the request by the user for the override from the at least one of the one or more mobile electronic devices containing the electronic receipts software;

receive a third signal from the electronic receipts software indicating the selection by the user of the digital button indicating the request for the override to print the electronic receipt;

overriding the rule allowing the user to receive the electronic receipts included in the user account; and transmit an electronic receipt print request including the electronic receipt to the POS terminal upon receiving the request for the override to print the electronic receipt from the electronic receipts software and cause the POS terminal to print a paper copy of the electronic receipt.

19. The system of claim 18, wherein the POS terminal is configured to render an image of a reprint button on the display device of the POS terminal to use in initiating the printing of the paper copy of the electronic receipt.

20. The system of claim 18, wherein the electronic receipts software is configured to render the QR code on the at least one of the one or more mobile electronic devices, the QR code comprising identifying information used to identify the user account associated with the user, the POS terminal including a QR code reader for use in capturing the QR code from the at least one of the one or more mobile electronic devices and generate the transaction information including the identifying information.

* * * * *